United States Patent [19]

Jungkman

[11] 4,357,204
[45] Nov. 2, 1982

[54] CHEMICALLY MACHINED SPECTRAL GRATING

[75] Inventor: David L. Jungkman, Hudson, N.H.

[73] Assignee: Honeywell Inc., Minneapolis, Minn.

[21] Appl. No.: 269,193

[22] Filed: Jun. 1, 1981

[51] Int. Cl.³ ............................................. G02B 5/18
[52] U.S. Cl. .................................. 156/645; 156/647; 156/657; 156/659.1; 156/662; 350/162 R
[58] Field of Search ............... 156/647, 645, 636, 662, 156/643, 657, 659.1; 350/162 R

[56] References Cited

U.S. PATENT DOCUMENTS 3,615,955 10/1971 Regh et al. ........................ 156/636

OTHER PUBLICATIONS

Tsang et al., "Preferentially Etch . . . Silicon", J. of Appl. Phys., vol. 46, No. 5 (5/75), pp. 2163-2165.
Bassous, "Fabrication . . . Silicon", IEEE Trans. on Electron Devices, vol. 25, No. 10 (10/78), pp. 1178-1185.
Lee, "Anisotropic . . . Silicon", J. of Appl. Phys., vol. 40, No. 11 (10/69), pp. 4569-4574.
Matsui et al., "Fabrication . . . Etching", Jap. J. of Appl. Phys., vol. 19, No. 3 (3/80), pp. 126-127.

*Primary Examiner*—Jerome W. Massie
*Attorney, Agent, or Firm*—John S. Solakian

[57] ABSTRACT

A process for manufacturing spectral gratings having very low blaze angles by preferential etching of single crystal substrates with the resultant exposed crystal planes utilized as the grating.

10 Claims, 6 Drawing Figures

CHEMICALLY MACHINED SPECTRAL GRATING

BACKGROUND OF THE INVENTION

The present invention relates to spectral measurement devices and more particularly to a process for manufacturing a diffraction grating having a low blaze angle.

A diffraction grating is the key element of most spectral measurement devices. The diffraction grating is an optical device which creates a spectrum by the diffraction of a beam of electromagnetic radiation (most typically light) through a grating consisting of closely and regularly spaced parallel grooves incised in some substantially planar surface. In a grating used in optical transmission, the surface is typically glass or plastic. When used for reflection, a polished aluminum or metal mirror is used for the surface. One type of reflective grating commonly used for infrared wavelengths are echelette gratings. These gratings or grooves take the form of a series of stepped optically flat surfaces inclined at some specified angle to reflect the majority of energy in one direction and into a specific diffractive order. The angle that the stepped surfaces make with the front surface of the grating (the blaze angle), together with the distance between steps (for defining the pitch of the grating), and length of each stepped surface, specify the primary characteristics of the grating.

In the past, such gratings have typically been made mechanically using a device called a ruling engine. The ruling engine consists of a precisely shaped diamond cutter mounted on a two-axis slide assembly so that each groove of the grating is cut by successive passes of the diamond tool across the metal blank. The finished grating can be used as is, or as a master for the production of replicated gratings. This technique works well for many types of gratings, but has not been capable of producing reflective gratings with low blaze angles.

It is accordingly a primary object of the present invention to provide a process for manufacturing spectral gratings having low blaze angles.

SUMMARY OF THE INVENTION

The above and other objects of the present invention are achieved according to the present invention by providing a process which utilizes techniques of photoresist and preferential etching of monocrystalline materials, for example, silicon, to fabricate low blaze angle diffraction gratings for use in the infrared wavelengths.

More particularly, a process for manufacturing a diffraction grating having a low blaze angle is provided having the method steps of forming an etchable monocrystalline material in which the crystal planes of the material are oriented at a desired angle, i.e., the blaze angle, to the top surface of the material; exposing one of the desired crystal faces of the material; oxidizing the material to create an oxide coating over the top surface of the material; applying a layer of photoresist material over the oxide coating; placing a mask over the photoresist material, the mask having a series of narrow opaque lines whose spacing is the desired spacing between the desired ones of the crystal faces of the material; etching the oxide coating so that lines of the oxide coating under the mask still remain on the top surface; and exposing the material to an etchant so that crystal surfaces, parallel to the crystal face, which intersect the lines of the oxide coating, are formed.

BRIEF DESCRIPTION OF THE DRAWINGS

The above and other objects of the present invention are achieved in the illustrative embodiment with respect to the Figures in which.

DETAILED DESCRIPTION OF THE PREFERRED EMBODIMENT(S)

The following describes the process of manufacture of a low blaze angle (e.g., one (1) milliradian) reflective diffraction grating utilizing the teachings of the present invention. The process is described for a silicon substrate, although other etchable monocrystalline materials might be substituted.

Figure 1:
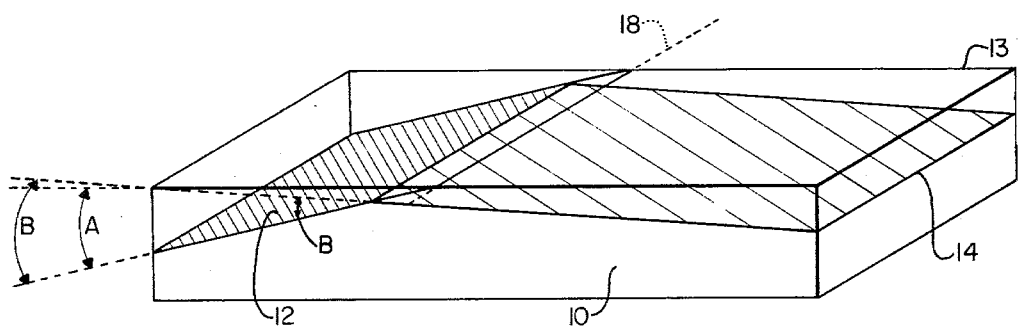
FIG. 1 summarizes the angular relationship of crystal planes to the surfaces of a silicon blank used in the manufacturing process of the present invention.
Figure 2A:
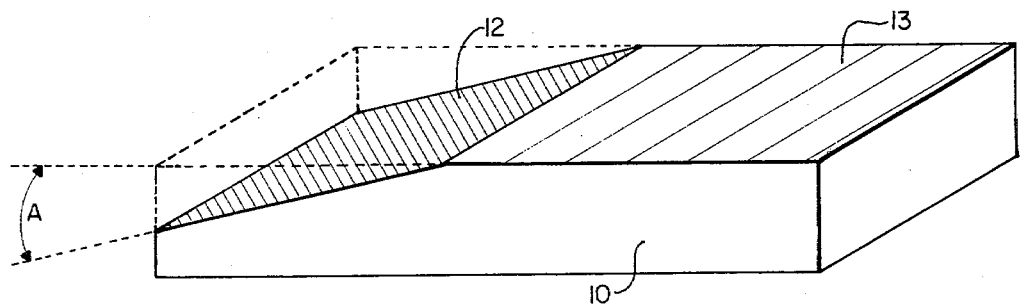
FIGS. 2A through 2E illustrate the manufacturing process of an echelette grating in accordance with the teachings of the present invention.
Figure 2B:
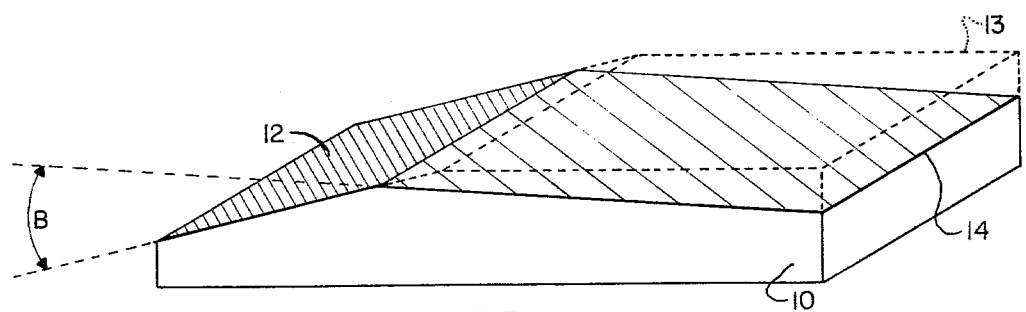
Figure 2C:
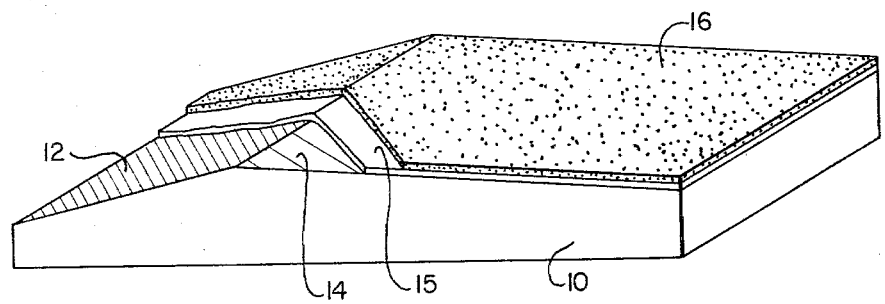
Figure 2D:
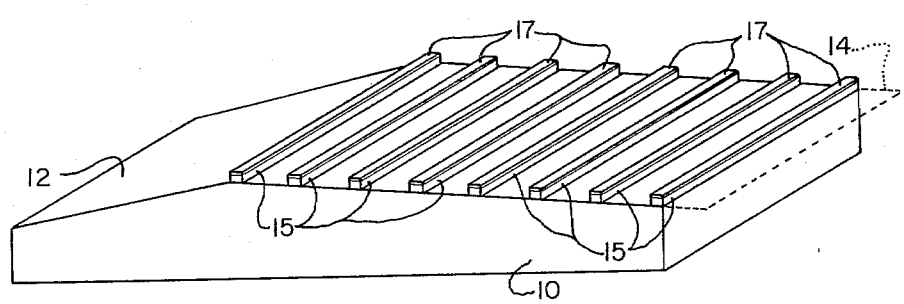
Figure 2E:
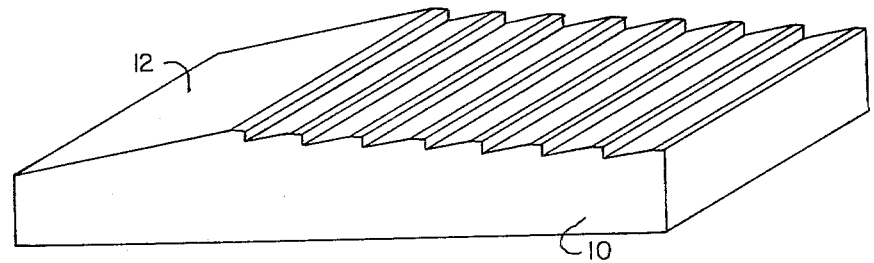

FIG. 1 should be referenced for an overall view of the geometrical relationships involved in the process of the present invention. FIGS. 2A through 2E illustrate the actual process. Briefly, FIG. 2A shows a silicon blank 10 which has been etched to expose a (111) crystal plane 12. FIG. 2B shows the same silicon blank after the angular relationship between the top surface 13 of the blank and the (111) crystal face 12 has been redefined as new top surface 14 by lapping an polishing. FIG. 2C shows the same silicon blank after deposition of successive layers of steam oxide and photoresist. FIG. 2D shows the same silicon blank after application of a photomask and etch of the steam oxide layer. FIG. 2E shows the same silicon blank after preferential etching to define the grating surfaces.

Prior to discussing the process of the present invention in detail, the designation (111) is discussed. The orientation of a specific crystal face to its crystallographic axes is conveniently expressed by a system of assignment of numerical values to each face, termed the "Miller Indices". The Miller Indices of an arbitrary crystal face "hkl" are the unitized reciprocals of the intercepts of the face with the crystallographic axes a,b,c, defined by the symmetry of the crystal. In the specific example the (111) plane refers to a crystal face which intersects each of the positive orthogonal crystallographic axes of silicon (an isometric crystal) at one unit length from the crystal center. The designation {111} is used to refer to the set of all planes which intersect the crystallographic axes a distance of one unit, and would comprise the (111) planes, as well as the ($\bar{1}11$), ($1\bar{1}1$), ($11\bar{1}$), ($\bar{1}\bar{1}1$), ($1\bar{1}\bar{1}$), ($\bar{1}1\bar{1}$) and ($\bar{1}\bar{1}\bar{1}$) planes, where a bar above the number notes that the plane intercepts the negative axes.

More particularly, with reference to FIG. 1 and the process shown by FIGS. 2A through 2E, a block of monocrystalline silicon is cut to form a blank 10 approximately 2 millimeters thick, in which the (111) crystal planes (as shown for example by plane 12) are oriented at an angle A to the top surface 13 of the blank 10 as shown in FIG. 2A. In practice angle A is as close to the desired blaze angle of the finished grating as is possible. For purposes of illustration, it is assumed that the angle A is 1.3 milliradians. Surface 13 is lapped and polished to create an optically reflective surface. An end (e.g., the left side) of the substrate which will be scrapped is exposed to an etchant of pyrocatechol or sodium hydroxide which exposes the (111) crystal faces within the blank 10. This (111) crystal face is preferrentially exposed because it is 30–50 times more resistant to the etch than unoriented silicon.

The exact angular relationship between the mechanically polished surface 13 and the chemically polished (111) plane 12 as shown in FIG. 2A may be determined by standard optical techniques. The desired blaze angle B, the angular relationship between planes 12 and 14, is obtained by removal of material from surface 13 by standard lap and polish techniques until the new top surface is plane 14, as shown in FIG. 2B.

The substrate is then cleaned and oxidized, for example, in a steam oxide generator, to create an oxide coating 15 on surface 14, which coating 15 is approximately 10,000 angstroms thick. This oxide coating must be free of defects, since it will serve as the etch mask material in later steps. A layer of photoresist 16 is applied above the oxide layer 15 by standard dip or spin-on techniques.

A mask 17 is applied to surface 16 and the photoresist is exposed. The mask includes a series of narrow opaque lines whose spacing is the desired spacing of the grooves on the completed grating. The spatial frequency of the grooves is a design characteristic of the grating. In this example, which will be used in the infrared spectrum, the grating spacing is relatively coarse, 1500 lines/inch. The mask line width must be minimized since the area beneath each line is wasted and will reflect a certain portion of the incident energy in an unwanted direction. In practice, this line width will be a function of the resolution of the photo mask, the undercutting of the mask by the etch, and the ability to optically align the mask so that the lines of the mask are parallel to the intersection of planes 12 and 14 (shown by line 18 on FIG. 1) in the previously etched region of the blank. In the present example, these mask lines of mask 17 are 0.0005 inches wide.

The oxide coating is then etched using hydrofluoric acid, leaving the narrow lines of oxide beneath the mask. The blank 10 is placed in a preferential etch of pyrocatechol or sodium hydroxide, so that the (111) surfaces 12 of the silicon substrate which intersect the mask lines 17 are exposed as shown in FIG. 2E.

The remaining oxide coating is removed using hydrofluoric acid. The finished grating consists of grooves formed by the chemically polished (111) planes exposed at angle B, separated by narrow strips of polished substrate which were beneath the mask 17 at plane 14. The blank grating is then trimmed to remove excess or unpatterned bulk material. The entire grating may then be metalized to increase reflectivity in the selected waveband.

Having described the invention, what is claimed as new and novel and for which it is desired to secure Letters Patent is:

1. A process for manufacturing a diffraction grating having a low blaze angle, said process comprising the method steps of:

A. forming an etchable monocrystalline material in which the crystal planes of said material are oriented at a first angle to the top surface of said material, said first angle as close as possible to the desired blaze angle;
   B. finishing said top surface to create a substantially flat and polished surface;
   C. exposing one end of said material to an etchant in order to expose the desired crystal face in said material;
   D. removing said top surface until a new top surface is obtained, which new top surface forms the desired blaze angle with said exposed crystal face, wherein the intersection of said exposed crystal face with said new top surface of said material forms a reference line;
   E. oxidizing said material to create an oxide coating over said new top surface;
   F. applying a layer of photoresist material over said oxide coating;
   G. placing a mask over said photoresist material, said mask having a series of narrow opaque lines whose spacing is the desired spacing of grooves associated with said blaze angle and wherein said mask is so placed such that said opaque lines are substantially parallel to said reference line;
   H. etching said oxide coating so that lines of said oxide coating under said mask still remain on said new top surface; and
   I. exposing said material to an etchant so that crystal surfaces, parallel to said crystal face, which intersect said lines of said oxide coating, are formed.

2. A process as in claim 1 wherein each of said steps of finishing and removing include steps of lapping and polishing.

3. A process as in claim 1 further comprising the method step of metalizing said grating so as to increase its reflectivity in a selected waveband.

4. A process as in claim 1 wherein said etchant in said step of exposing one end of said material and said etchant in said step of exposing said material are either pyrocatechol or sodium hydroxide.

5. A process as in claim 1 wherein said material is silicon.

6. A process as in claim 1 wherein said desired crystal face is thirty to fifty times more resistant to etchant than the portions of said material which are not crystally oriented.

7. A process as in claim 1 wherein the density of said lines of said oxide coating are in the order of fifteen hundred lines per inch.

8. A process as in claim 1 wherein the width of said lines of said oxide coating is in the order of five ten thousandths of an inch.

9. A process as in claim 1 wherein said blaze angle may be less than a milliradian.

10. A process as in claim 1 wherein said crystal planes of said material are the crystal planes.

* * * * *